(12) United States Patent
Oumi et al.

(10) Patent No.: US 7,437,240 B2
(45) Date of Patent: Oct. 14, 2008

(54) NAVIGATION SYSTEM AND PROGRAM FOR CONTROLLING THE SAME

(75) Inventors: Masanori Oumi, Gifu (JP); Takamitsu Suzuki, Okazaki (JP); Hirotoshi Iwasaki, Tokyo (JP); Kosuke Hara, Tokyo (JP); Nobuhiro Mizuno, Tokyo (JP)

(73) Assignees: Denso Corporation, Kariya (JP); Denso IT Laboratory, Inc., Tokyo (JP)

( * ) Notice: Subject to any disclaimer, the term of this patent is extended or adjusted under 35 U.S.C. 154(b) by 24 days.

(21) Appl. No.: 11/476,889

(22) Filed: Jun. 29, 2006

(65) Prior Publication Data

US 2007/0005240 A1 Jan. 4, 2007

(30) Foreign Application Priority Data

Jul. 1, 2005 (JP) ............................. 2005-194103

(51) Int. Cl.
*G01C 21/30* (2006.01)
(52) U.S. Cl. .................... 701/209; 701/200; 340/988
(58) Field of Classification Search ................. 701/209, 701/200; 340/988
See application file for complete search history.

(56) References Cited

U.S. PATENT DOCUMENTS

| | | | | |
|---|---|---|---|---|
| 6,026,346 A | * | 2/2000 | Ohashi et al. | 701/210 |
| 6,714,862 B1 | * | 3/2004 | Lau et al. | 701/209 |
| 6,732,048 B2 | * | 5/2004 | Blewitt | 701/210 |
| 7,054,742 B2 | * | 5/2006 | Khavakh et al. | 701/209 |
| 2005/0107951 A1 | * | 5/2005 | Brulle-Drews et al. | 701/209 |
| 2005/0131641 A1 | * | 6/2005 | Beesley et al. | 701/209 |
| 2006/0242199 A1 | * | 10/2006 | Cobleigh et al. | 707/104.1 |

FOREIGN PATENT DOCUMENTS

| | | |
|---|---|---|
| JP | A-5-224601 | 9/1993 |
| JP | A-2002-148065 | 5/2002 |
| JP | A-2003-121191 | 4/2003 |
| JP | A-2004-355075 | 12/2004 |

* cited by examiner

*Primary Examiner*—Mark Hellner
(74) *Attorney, Agent, or Firm*—Posz Law Group, PLC

(57) ABSTRACT

A navigation system, having a route calculation unit for providing a navigation route from a start point to a destination based on an evaluation of a plurality of cost parameters by an evaluation function, includes a storage unit for storing a weighting factor determination relation for determining a weighting factor of the cost parameter based on a travel situation of predetermined type identified in a specific length of time and a weighting factor determination unit for determining the weighting factor based on the weighting factor determination relation and the travel situation derived from an actual state of traveling.

13 Claims, 6 Drawing Sheets

NAVIGATION SYSTEM AND PROGRAM FOR CONTROLLING THE SAME

CROSS REFERENCE TO RELATED APPLICATION

This application is based on and claims the benefit of priority of Japanese Patent Application No. 2005-194103 filed on Jul. 1, 2005, the disclosure of which is incorporated herein by reference.

FIELD OF THE INVENTION

The present invention generally relates to a navigation system for a vehicle and a program for controlling the navigation system.

BACKGROUND OF THE INVENTION

A navigation system typically used in a vehicle determines a navigation route toward an inputted destination of a travel for navigating a user/driver of the vehicle. That is, for example, the navigation system disclosed in Japanese Patent Document JP-A-H5-224601 determines the navigation route toward the destination of the travel by using a cost minimizing method based on the Dijkstra method or the like. In the navigation system disclosed in the above document, the cost of the navigation route is calculated and evaluated by adding plural types of cost with its weighting factor multiplied thereon.

The Japanese Patent Document JP-A-H5-224601 is an example of a car navigation system, and the parameters for cost calculation includes a distance of travel, an average travel time, a width of a road and the like. The weighting factors for those parameters can be adjustably changed for prioritizing a specific characteristic of route navigation represented by those parameters.

The navigation system of the above patent document calculates a navigation route by using an evaluation function, and the navigation route having the minimum evaluation value (a "cost" of the navigation route) is presented to the user as a first option among the plural route selections. Then, the weighting factor of the respective parameters is adjustably changed for rearrangement of the cost calculation priority when the user selects an alternative route (i.e., a route different from the first option). In other words, the weighting factors of the parameters are changed so that the cost of the selected navigation route is calculated as a minimum in comparison to the cost of the other navigation routes. In this manner, route selection of the navigation system is gradually tailored to reflect the user's preference such as a distance first selection, a travel time first selection, an ease of travel selection or the like.

Though the navigation system of the above patent document does reflect the user's preference on the route selection, the user's preference itself does change depending on, for example, the day of the week, the time of the day or the like. That is, the user may select the travel time first selection on weekdays to quickly get to a destination of the travel while the user select the ease of travel selection on the weekend at the cost of the travel time. Other cases for change of the selection may be that the ease of travel is preferred when the user is going home in the evening, while the shorter travel time is preferred for other time of the day.

The user's preference may be changed according to the context of the travel specifically for a short time range of the travel such as a specific time slot of the day, the day of the week or the like. However, the navigation system in the above disclosure does not take that kind of changing user preference into account. That is, the navigation system fails to reflect the user's preference when, for example, the time slot of the travel does not match the expectation/assumption of the navigation system. The user of a handheld type navigation system may encounter the same problem when the navigation system adopts the same navigation algorithm.

SUMMARY OF THE INVENTION

In view of the above-described and other problems, the present disclosure provides description of a navigation system that searches for a navigation route of user's preference even when the user's preference is changed at times according to driving situations or the like.

The navigation system of the present disclosure includes (1) a route calculation unit for providing a navigation route from a start point to a destination based on an evaluation of a plurality of cost parameters by using an evaluation function, (2) a storage unit for storing a weighting factor determination relation for determining a weighting factor of the cost parameters based on a travel situation of a predetermined type in a specific length of time, and (3) a weighting factor determination unit for determining the weighting factor based on the weighting factor determination relation and the travel situation derived from an actual state of traveling.

The navigation system of the present disclosure adaptively changes the weighting factors of the cost parameters of the evaluation function to accommodate a navigation route provision function to a temporary travel situation at the time of actual travel, thereby enabling the navigation route to variably agree with the user preference at the time of travel.

In another aspect of the present disclosure, the navigation system uses user information in combination with the travel situation for determining the weighting factor determination-relation. In this manner, agreement of the navigation route to the user preference becomes more probable.

In yet another aspect of the present disclosure, the weighting factor determination relation includes an observation parameter having two states for respectively representing a weekday and a holiday. In this manner, change of the user's preference in accordance with the day of the week is reflected on the selection of the navigation route.

In still yet another aspect of the present disclosure, the weighting factor determination relation is prepared by using, for example, Bayesian network model. In addition, the relation may be prepared by using other method or reasoning such as neural network, support vector machine, fuzzy reasoning, collaborative filtering or the like.

In still yet another aspect of the present disclosure, the weighting factor determination unit of the navigation system uses weighting factor table for determining the weighting factors of the evaluation function. That is, the weighting factors used in the evaluation function form a plurality of weighting factor sets in a tabular form for being selectively applied to the evaluation function that adaptively accommodates the navigation route provision function to the travel situation. Further, a plurality of the navigation routes calculated by using respectively different weighting factor sets may be provided for the user. In this manner, the user can have the plural navigation route options for evaluating the agreement of each route to his/her preference.

In still yet another aspect of the present disclosure, the navigation system includes (1) a preference determination unit in the weighting factor determination unit, (2) a route option calculation unit in the route calculation unit, (3) a route attribute determination unit in the route calculation unit and (4) a route determination unit in the route calculation unit. The route attribute preference determination unit determines user preference of route selection based on the travel situation and the user information. That is, the travel situation and the user information are combined to be reflected on the evaluation function as a set of weighting factors used therein, and the route attribute preference determination unit finds a specific set of weighting factors from among the plural sets of the tabular form of weighting factors for suitably reflecting the user preference of the route selection in the evaluation function. Then, the route option calculation unit, the route attribute determination unit, and the route determination unit are respectively employed to determine plural route options, to determine the route attributes for respective route option in accordance with the determination of the route attribute preference determination unit, and to determine a best route having the route attribute that possesses a highest matching degree to a specific route attribute preference derived from comparison between the route options with the specific route attribute preference.

In still yet another aspect of the present disclosure, the navigation system finds and determines the navigation route from among the route options that is most similar to an actually traveled route, and changes the weighting factor determination relation for enabling the weighting factor determination unit to provide the navigation route having a highest similarity to the actually traveled route. That is, the navigation route having the highest similarity is determined by using the weighting factor determination relation adaptively changed by a relation determination unit in the weighting factor determination unit based on the travel situation used for determining the navigation route having the highest similarity, and the route of the highest similarity is determined by using a similar route determination unit. In this manner, the user preference of the route selection depending on the changing travel situations at the specific time of actual travel is reflected on the evaluation function of the navigation route provision function of the navigation system.

In still yet another aspect of the present disclosure, a program for controlling the navigation system to provide the function of the weighting factor determination unit is provided as a procedure stored in a memory medium such as an EEPROM, a hard disk, a portable type memory disk or the like. The procedure may also be stored in the memory in a server computer of a communication network or the like.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present disclosure are described with reference to the drawings. Like parts have like numbers in each of the embodiments.

Figure 1:
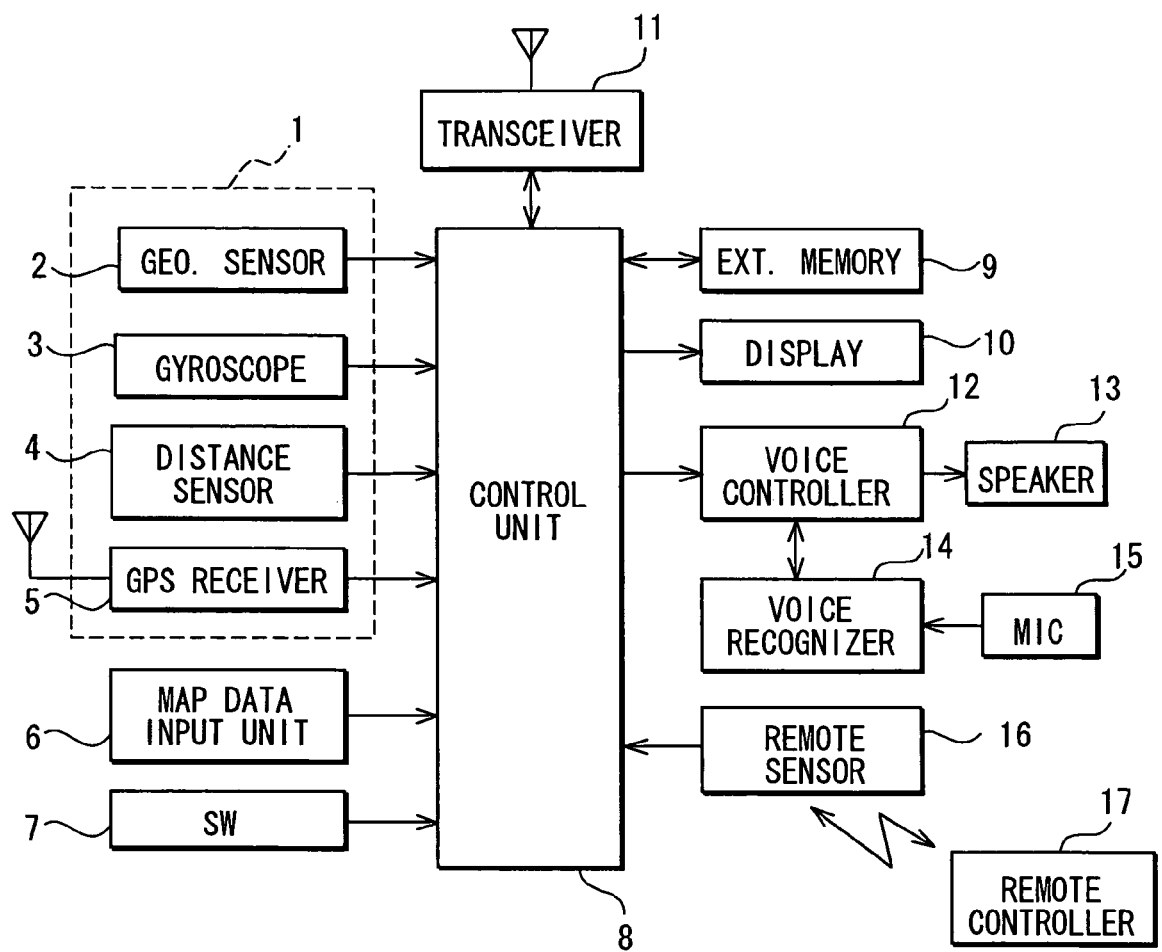
FIG. 1 shows a block diagram of a car navigation system in an embodiment of the present disclosure.

FIG. 1 shows a block diagram of a car navigation system in an embodiment of the present disclosure. The navigation system includes a position detector 1, a map data input unit 6, operation switches 7, an external memory 9, a display 10, a transceiver 11, a voice controller 12, a speaker 13, a voice recognizer 14, a microphone 15, a remote controller sensor 16, a remote controller 17, a traffic information sensor 18 and a control unit 8. The control unit 8 controls the above-described devices connected thereto.

The control unit 8 is a well-known type computer that includes a CPU, a ROM, a RAM, an I/O and a bus line for connecting those components. The ROM stores a program that is executed by the control unit 8, and the CPU controlled by the program processes predetermined calculations and other procedures.

The position detector 1 includes a plurality of well-known type sensors such as a geomagnetism sensor 2, a gyroscope 3, a distance sensor 4, and a Global Positioning System (GPS) receiver 5. The geomagnetism sensor 2 is used to detect a magnetic direction of a vehicle, and the gyroscope 3 is used to detect a relative bearing of the vehicle. The distance sensor 4 is used to detect a travel distance of the vehicle, and the GPS receiver 5 receives a radio wave from a satellite for detecting a position of the vehicle. These sensors and/or receivers are complementarily used with each other for interactive error compensation, because of respectively different characteristics of inherent errors. These sensors and/or receivers may selectively be used based on the accuracy of the output, and a steering rotation sensor, a speed sensor or the like (not shown in the figure) may additionally be utilized.

The map data input unit 6 is used to input digital map data such as road data, background drawing data, text data, facility data and the like. These data are provided by a memory medium such as a DVD-ROM, a CD-ROM. The map data input unit 6 retrieves these data by using a DVD-ROM drive, a CD-ROM drive or the like (not shown in the figure) connected thereon.

The operation switches 7 are disposed on, for example, the display 10 as touch switches, mechanical switches or the like, and are used for inputting various kinds of instructions for controlling road map on the display 10. That is, the road map control instructions include a map scale change instruction, a menu selection instruction, a destination setting instruction, a route search instruction, a navigation start instruction, a current position correction instruction, a screen change instruction, a volume control instruction and the like.

The remote controller 17 has a plurality of switches (not shown in the figure) for inputting the same kind of instructions as the operation switches 7. The remote controller 17 outputs control signals to the control unit 8 through the remote controller sensor 16.

The external memory 9 is a memory medium, e.g., a memory card, a hard disk or the like, with read/write capability for storing information such as text data, image data, sound data as well as user data of home location and the like.

Figure 2:
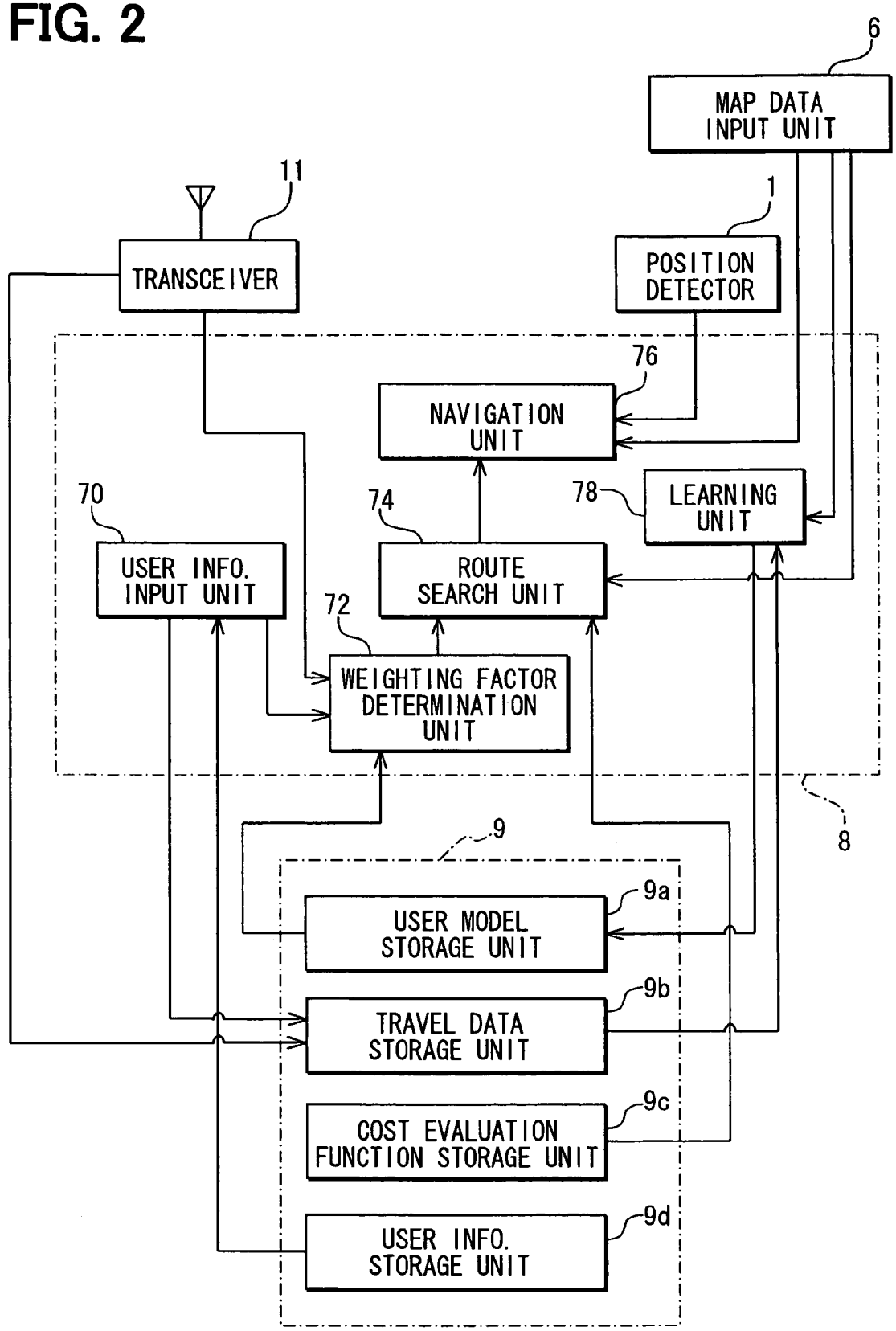
FIG. 2 shows a block diagram of functions in a control unit of the navigation system in FIG. 1.

The external memory 9 in the present disclosure includes a user model storage unit 9a, a travel data storage unit 9b, a cost evaluation function storage unit 9c and a user information storage unit 9d as shown in FIG. 2.

Figure 3:
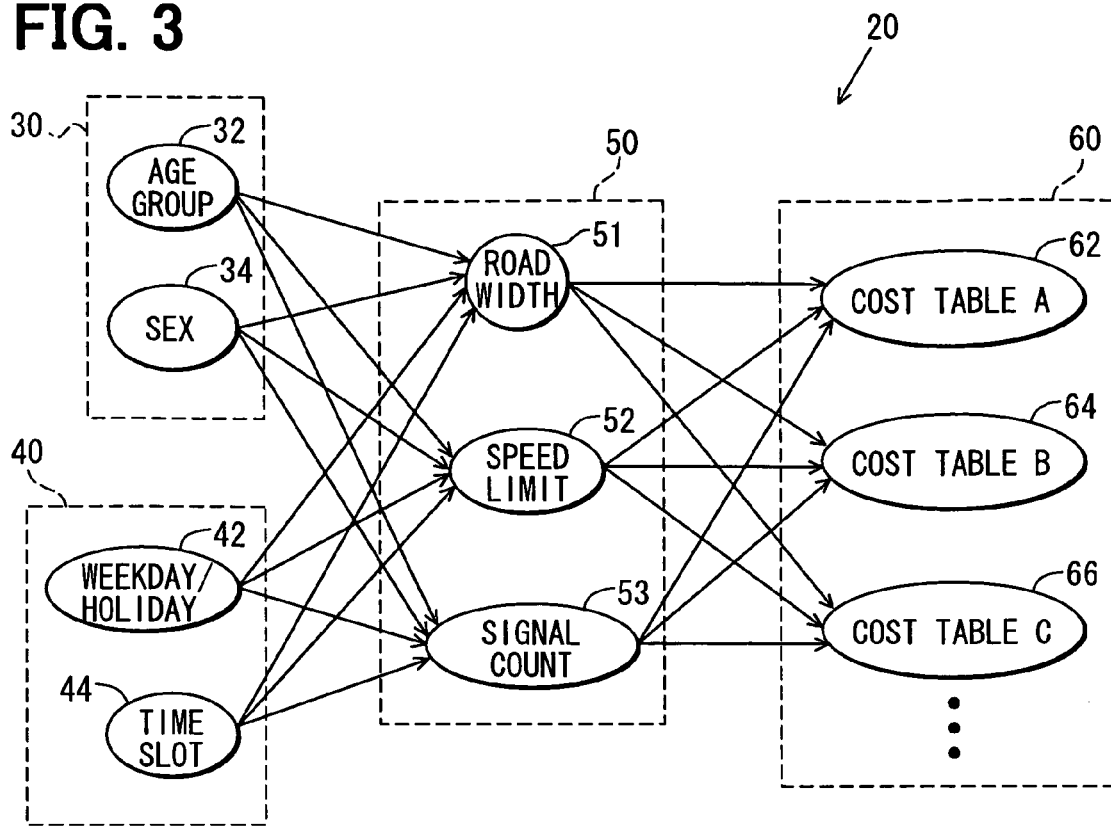
FIG. 3 shows an illustration of Bayesian network model in a user model storage unit in FIG. 2.

The user model storage unit 9a stores Bayesian network model 20 for determining weighting factor of the evaluation function illustrated in FIG. 3. The Bayesian network model 20 includes user information 30, travel situation 40, critical attribute 50, a set of cost tables 60. The user information 30 includes two nodes, that is, an age node 32 and a sex node 34. The travel situation 40 also includes two nodes, that is, a day node 42 and a time node 44. The critical attribute 50 includes three nodes, that is, a route width node 51, a speed limit node 52, and a signal count node 53. The set of cost tables 60 includes a plurality of cost table nodes such as a cost table A node 62, a cost table B node 64, a cost table C node 66 and the like.

The age node 32 transits between plural states for representing ages in teens, ages in twenties and the like. The sex node 34 transits between alternative states for representing the male sex and the female sex. The day node 42 transits between alternative states for representing the weekday and the holiday. The time node 44 transits between plural states for representing time slots allocated in 24 hours of the day. The duration of each time slot may be 4 hours, 2 hours, 1 hour or the like. The age node 32, the sex node 34, the day node 42 and the time node 44 are observation parameters.

The critical attribute 50 is used to represent user preference for use in the route search. That is, the critical attribute 50 is a route calculation determination factor for reflecting user preference in the navigation route. The route width node 51 represents importance of route width in the route calculation. The speed limit node 52 represents importance of speed limit in the route calculation. The signal count node 53 represents importance of the number of traffic signals in the route calculation. Each of the nodes in the critical attribute 50 takes and transits between plural states of importance such as 1, 2, 3 or the like.

The A node 62, B node 64 and C node 66 of the set of the cost tables 60, for example, respectively represent a cost table A, a cost table B, a cost table C as shown in FIG. 3. In this case, each entry in the cost table is a set of weighting factors stored in a tabular form for use in an evaluation function Ci that is represented by an equation 1. That is, in other words, each set of weighting factors determines importance hierarchy of member factors in the evaluation function.

$$Ci = \alpha_A a(i) + \beta_A b(i) + \gamma_A c(i) + \delta_A d(i) + \sim\sim\sim$$ [Equation 1]

The a(i) in the equation 1 is a cost of the distance, the b(i) in the equation 1 is a cost of the route width, the c(i) in the equation 1 is a cost of the speed limit, and the d(i) in the equation 1 is a cost of the number of the traffic signals. The equation 1 may include other cost such as a cost of an average travel time. The suffix A attached to each member factor, i.e., $\alpha$, $\beta$ and the like, corresponds to the name of the cost table. The cost evaluation function Ci is stored in the cost evaluation function storage unit 9c.

The cost table A node 62, the cost table B node 64 and the like are the nodes that respectively represent probability of appropriateness for each of the cost tables in terms of use of the table (a specific set of the weighting factors) in the cost evaluation function Ci. The probabilities represented by these nodes take stepwise values or discreet values.

The nodes 62, 64, 66 in the set of the cost tables 60 are child nodes of the nodes 51, 52, 53 in the critical attribute 50, and the nodes 51, 52, 53 are child nodes of the nodes 32, 34, 42, 44 of the user information 30 and the travel situation 40. In other words, the nodes 32, 34, 42, 44 are parent nodes of the nodes 51, 52, 53, and the nodes 51, 52, 53 are parent node of the nodes 62, 64, 66. The parent nodes and the child nodes are connected by arrows, and each arrow represents conditional dependency between the node on the start point side and the node on the end point side. That is, each arrow has conditional probability associated thereto.

The Bayesian network model 20 described above determines the probability of the nodes 62, 64, 66 in the set of the cost tables 60 when the user information and the travel situation are provided.

The travel data storage unit 9b stores the route traveled by the vehicle in association with the travel situation at the time of the travel. The user information storage unit 9d stores user information such as sex, age group in association with a user ID. In this case, even though an increment of the user age at an interval of a year causes age group change of a specific user after years of increments, the user age can be used to identify the user unambiguously by calculating the difference between the birth date and the current date. That is, the user age can be used as an identity of the specific user.

The display 10 is, for example, a liquid crystal display, an organic EL display or the like, and displays a position mark of the vehicle at a current position in a map display area of the display 10 together with the road map generated by using the map data. The display 10 also displays other information such as a current time, traffic congestion information or the like in addition to the current vehicle position and the road map.

The transceiver 11 is a communication device for providing communication with external information sources for the control unit 8. For example, traffic information, weather information, date information, facility information and advertisement information are received from external information resources by using the transceiver 11. The information may be outputted from the transceiver 11 after processing in the control unit 8.

The speaker 13 is used to output a predetermined sequence of sound such as navigation guidance voice, screen operation guidance voice, voice recognition result or the like based on a sound output signal from the voice controller 12.

The microphone 15 converts user's voice to an electric signal that can be inputted to the voice recognizer 14. The voice recognizer 14 recognizes the inputted user's voice for comparison with vocabulary data in an internal dictionary (not shown in the figure), and outputs a recognition result to the voice controller 12.

The voice controller 12 controls the voice recognizer 14, and gives response to the user by talking back from the speaker 13. The voice controller 12 also controls the input of the recognition result by the voice recognizer 14 to the control unit 8.

The control unit 8 executes predetermined processes in response to the user's voice based on the recognition result of the voice recognizer 14, or in response to the user input from the operation switches 7 or the remote controller 17. The predetermine processes include, for example, a map data storage process for storing map data in the memory 9, a map scale change process, a menu selection process, a destination setting process, a route search execution process, a route navigation start process, a current position correction process, a display screen change process, a volume control process and the like. Further, route navigation guidance information or the like processed in the control unit 8 is provided for the user in a suitable manner from the speaker 13 under control of the voice controller 12.

The destination setting process in the navigation system is executed based on the input from the remote controller 17 or the input from the operation switches 7, and the route search execution process is executed by selecting a cost table to be used in the cost evaluation function Ci. That is, the selection of the cost table is conducted based on the input of the user information including the age group and the sex to the Bayesian network model 20 that is stored in the user information storage unit 9a of the external memory 9, and the input of the travel situation including the weekday/holiday distinction and the time slot information for distinguishing and locating the moment of the travel in the 24 hour scale of the day. The cost evaluation function Ci calculates the cost of the navigation route by combining member factors with the weighting factor in the selected cost table. The route search execution process may provide plural route options. Further, the control unit 8 modifies the Bayesian network model 20 based on the actually traveled route. The modification applied to the Bayesian network model 20 based on the instances of the actual travels of the vehicle is designated as an acquisition of knowledge, or a study process, devised as a function of the navigation system.

FIG. 2 shows a block diagram of functions in a control unit 8 of the navigation system in FIG. 1. The control unit 8 includes a user information input unit 70, a weighting factor determination unit 72, a route search unit 74, a navigation unit 76 and a learning unit 78.

The user information input unit 70 determines a driver of the vehicle and receives user information of the driver from the user information storage unit 9d of the external memory 9. In this case, the user information includes the age group and the sex of the user. The information about who the user/driver is is selected from a list on the display 10 and inputted by using the operation switches 7 or by operation on the remote controller 17.

The weighting factor determination unit 72 inputs the user information from the user information input unit 70, the weekday/holiday distinction based on the day information from the transceiver 11 and the time slot information from a clock in the vehicle (not shown in the figure) to the Bayesian network model 20. The Bayesian network model 20 determines probabilities of each cost table node in the set of the cost tables 60. Then, the highest probability cost table is chosen to be applied to the evaluation function Ci.

The route search unit 74 determines a navigation route from the start point to the destination based on the cost table determined by the weighting factor determination unit 72, the cost evaluation function Ci that uses weighting factors in the selected cost table and the map data inputted from the map data input unit 6. The start point of the navigation route may be the current position of the vehicle or may be a different position inputted by the user.

The navigation unit 76 provides route navigation toward the destination based on the navigation route determined by the route search unit 74, the current position of the vehicle detected by the position detector 1 and the map data inputted from the map data input unit 6.

The learning unit 78 conducts learning process for updating the Bayesian network model 20 based on the actually traveled route, the travel situation at the time of the travel and the user information after arrival of the vehicle to the destination. The learning process by the learning unit 78 is described later in detail. The learning process may be conducted right after the arrival to the destination, or may be conducted after a certain period from the arrival.

Figure 4:
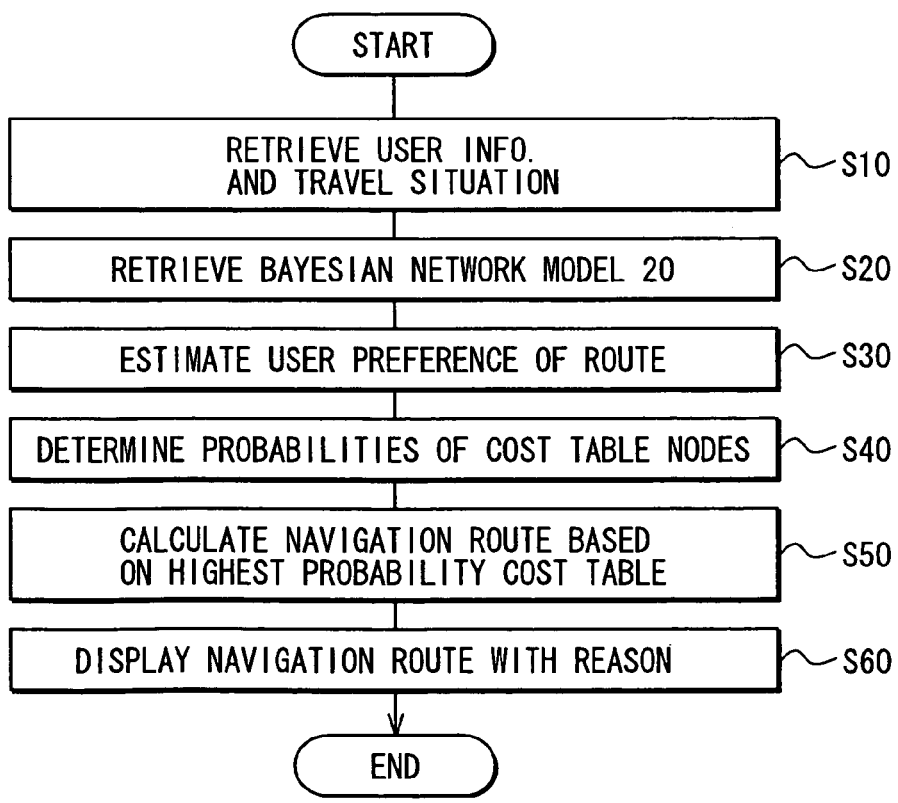
FIG. 4 shows a flowchart of a process for weighting factor determination and route calculation in a control unit in FIG. 2.

FIG. 4 shows a flowchart of a process for weighting factor determination and route calculation executed in the weighting factor determination unit 72 and the rote search unit 74 of the control unit 8. Steps S10 to S40 correspond to the function of the weighting factor determination unit 72, and steps S50 to S60 correspond to the function of the route search unit 74.

In step S10, the process retrieves the user information and the travel situation. That is, the user list is displayed on the display 10, and the user in the list is chosen by the operation switch 7 or the remote controller 17 for retrieving the information on the age group and the sex of the user from the user information storage unit 9d of the external memory 9. The distinction between the weekday and the holiday and the time slot of the day are determined based on the information from the transceiver 11 and the clock.

In step S20, the process retrieves the Bayesian network model 20 from the user model storage unit 9a.

In step S30, the process estimates the user preference in terms of route selection. As previously described, the critical attribute 50 representing the user preference has to be determined in this step based on the determination of each of the nodes 51, 52, 53 in the critical attribute 50. That is, the information retrieved in step S10 is assigned to the nodes of the Bayesian network model 20. More practically, the information on the age group and the sex of the user, the weekday/holiday distinction and the time slot are respectively assigned to the age node 32, the sex node 34, the day node 42 and the time node 44. Then, states of the child nodes of the nodes 32, 34, 42, 44, that is, states of the route width node 51, the speed limit node 52 and the signal count node 53 are determined to represent the importance of the user preference.

In step S40, the process determines the probability of each of the cost table nodes 62, 64, 66 and the like in the set of the cost tables 60 based on the states of the nodes 51, 52, 53 determined in S30.

In step S50, the process determines the cost table having the highest probability based on the determination in step S40. Then, the process calculates the navigation route from the start point to the destination based on the cost evaluation function Ci with the selected cost table applied thereto. The calculation employs the well-known type calculation method such as Dijkstra method or the like.

In step S60, the process displays the navigation route based on the calculation in step S50 with a reason of recommendation on the display 10. The reason of recommendation corresponds to either of the node 51, 52 or 53, that is, the node having the highest importance among the nodes 51, 52 or 53 in the critical attribute 50 of the Bayesian network model 20.

The navigation route toward the destination calculated and determined in the above-described manner is used for route navigation, and then, the navigation system learns the actually traveled route just after the arrival of the vehicle to the destination or at the time specified for the route learning.

Figure 5:
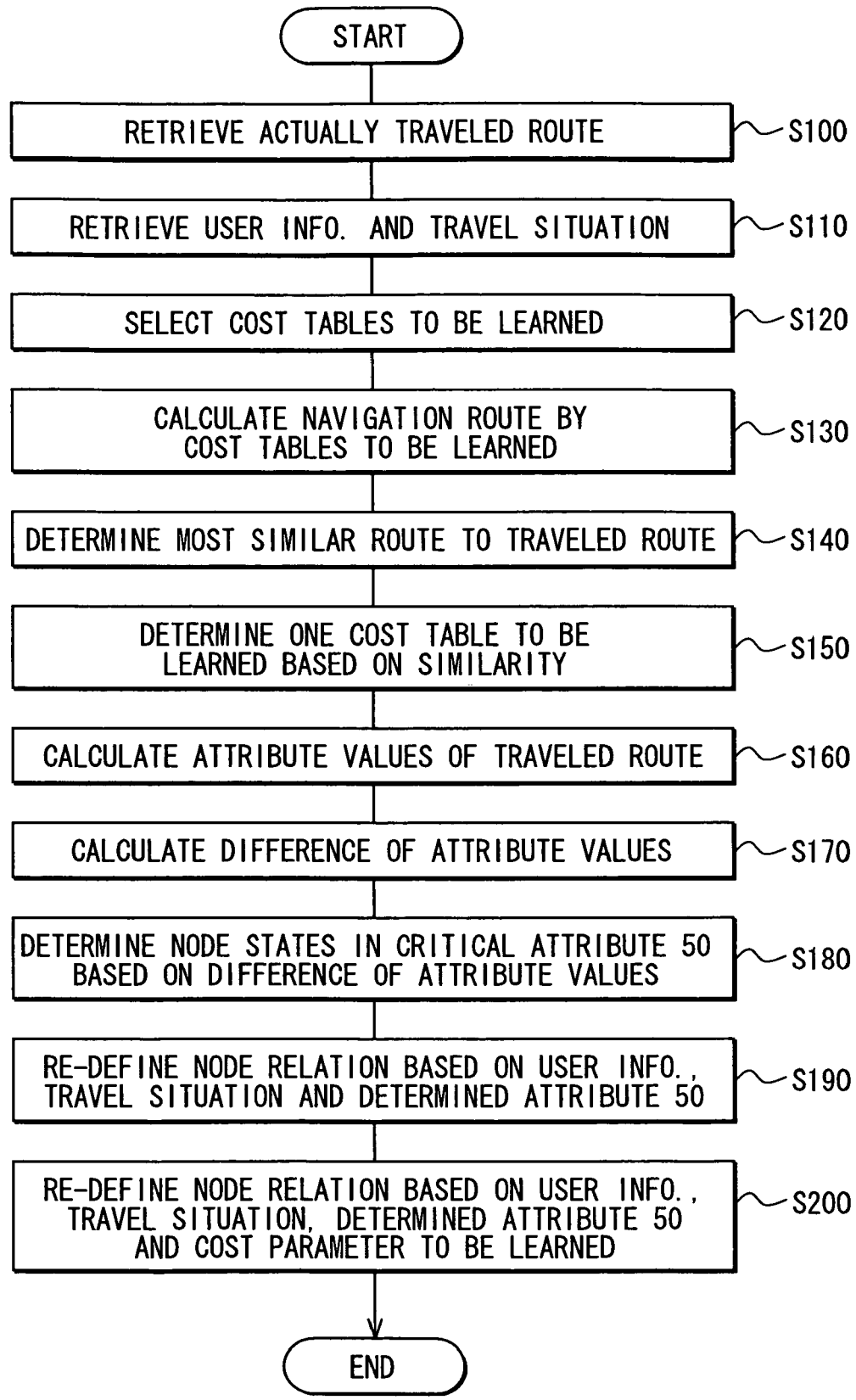
FIG. 5 shows a flowchart of a process for user preference acquisition in the control unit in FIG. 2.

The learning, or the acquisition of the user preference of the route selection is described as a flowchart shown in FIG. 5.

In step S100, the process retrieves the actually traveled route from the travel data storage unit 9b.

In step S110, the process retrieves the user information and the travel situation in association with the actual travel of the vehicle. That is, the age group and the sex of the user, and the weekday/holiday distinction and the time slot are retrieved.

In step S120, the process selects the cost tables to be learned from the set of the cost tables 60. That is, a predetermined number of cost tables are selected from the set of the cost tables 60 after calculating the probabilities of the nodes 62, 64, 66 and the like based on the user information, the travel situation retrieved in step S110 and the Bayesian network model 20 retrieved from the user model storage unit 9a. In this case, the cost tables sorted in the order of the calculated probability are listed for selection.

In step S130, the process conducts route calculation based on the cost tables selected in step S120. That is, the weighting factors in each of the selected cost tables are applied to the cost evaluation function Ci for calculating respective navigation routes.

In step S140, the process determines similarity between the actually traveled route retrieved in step S100 and the navigation routes calculated in step S130. The degree of similarity is calculated between the actually traveled route and each of the navigation routes calculated in step S130. The degree of similarity is evaluated by, for example, calculating accumulated difference of Y coordinates corresponding to the points having the same X coordinates on the actually traveled route and the calculated navigation route. After evaluating the similarity between the actual route and the calculated routes, the navigation route having the highest similarity is chosen as a most similar route.

In step S150, the process determines the cost table used to calculate the most similar navigation route in step S140 as the cost table to be learned.

In step S160, the process calculates route attribute values of the actually traveled route. The route attribute values include the values of the route attributes in the nodes 51, 52, 53 of the critical attributes 50 of the Bayesian network model 20. That is, the values of the route attributes in the present embodiment are, for example, the values of the route width (e.g., the number of lanes in the road), the values of the speed limit (e.g., an average of the speed limit) and the values of the traffic signal (e.g., the total number of the traffic signals).

In step S170, the process calculates route attribute values of the most similar navigation route in the same manner as the calculation in step S160. Then, the process determines difference of the route attribute values regarding the actually traveled route and the similar navigation route. The difference is calculated as a value of −10 (value of the traveled route is taken as "positive" in calculation) when the values of the traffic signal is taken as an example.

In step S180, the process determines the state of the nodes 51, 52, 53 in the critical attribute 50 based on the difference of the route attributes calculated in step S170. The determination is based on a predetermined relationship between the difference of the route attribute values and the states of the nodes 51, 52, 53 in the critical attribute 50.

In step S190, the process learns or re-defines the relationships between the critical attribute 50 (the child node) and the combination of the user information 30 and the travel situation 40 (the parent node) based on the user information/travel situation retrieved in step S110 and the critical attribute 50 determined in step S180.

In step S200, the process learns or re-defines the relationships between the set of the cost tables 60 (the child node) and the critical attribute 50 (the parent node) in the Bayesian network model 20 based on the cost table to be learned determined in step S150, the user information/travel situation retrieved in step S110 and the critical attribute 50 determined in step S180.

The learning process or the re-definition of the Bayesian network model 20 makes the process shown as the flowchart in FIG. 4 choose the weighting factor table that yields a navigation route having the highest similarity to the actually traveled route based on the same input of the travel situation. In this manner, the user preference of the route selection is more precisely reflected on the navigation route calculated by the navigation system of the present disclosure.

The navigation system of the present disclosure considers weekday/holiday difference and the time slot of the travel and reflects it on the navigation route selection even when the user preference of the navigation route selection is changed according to those attributes. Further, the age group and the sex of the user are taken into account for determining the weighting factors of the cost parameters for improved accuracy of the navigation route selection in terms of reflecting the user preference.

Although the present disclosure has been fully described in connection with the preferred embodiment thereof with reference to the accompanying drawings, it is to be noted that various changes and modifications will become apparent to those skilled in the art.

Figure 6:
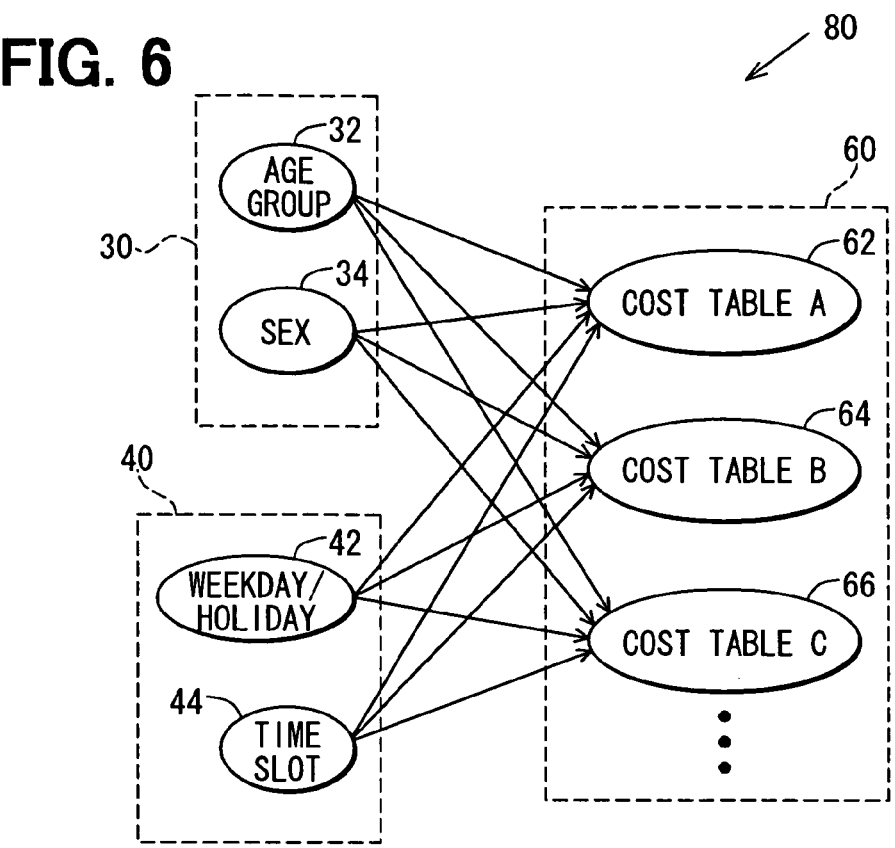
FIG. 6 shows an illustration of another set of Bayesian network model.

For example, the Bayesian network model 20 is replaced with a different type Bayesian network model 80 shown in FIG. 6.

The Bayesian network model 80 does not have the critical attribute 50 in the Bayesian network model 20 in FIG. 2, and the user information 30 and the travel situation 40 are defined as the parent nodes in the set of the cost tables 60. That is, the probability of the node 62 in the set of the cost table 60 may be calculated directly from the user information 30 and the travel attribute 40 without using the critical attribute 50.

The travel situation used in the Bayesian network model may include the day of the week, the weather, the season, the traffic congestion, the number of occupants of the vehicle, the amount of money belonging to the user, or the like in addition to the weekday/holiday difference and the time slot of the travel.

The user information used in the Bayesian network model may include the address of the user, the age, the hometown or the like in addition to the age group and the sex.

The learning process or the re-definition of the Bayesian network model 20 may be skipped when the process shown in the flowchart in FIG. 4 calculates the navigation route that is similar enough to the actually traveled route. That is, the learning process of the re-definition of the Bayesian network model 20 may be optional.

The user list displayed on the display 10 for user selection may be replaced with other method. That is, the user may be determined based on an image recognition, a voice recognition, or other type of recognition technique. Further, the user information may be directly inputted by the user him/herself.

The cost table selection may be conducted in the following manner. That is, a plurality of the cost tables may be selected and used for the navigation route calculation as shown in a flowchart in FIG. 7, instead of selecting and using only one cost table having the highest probability.

Figure 7:
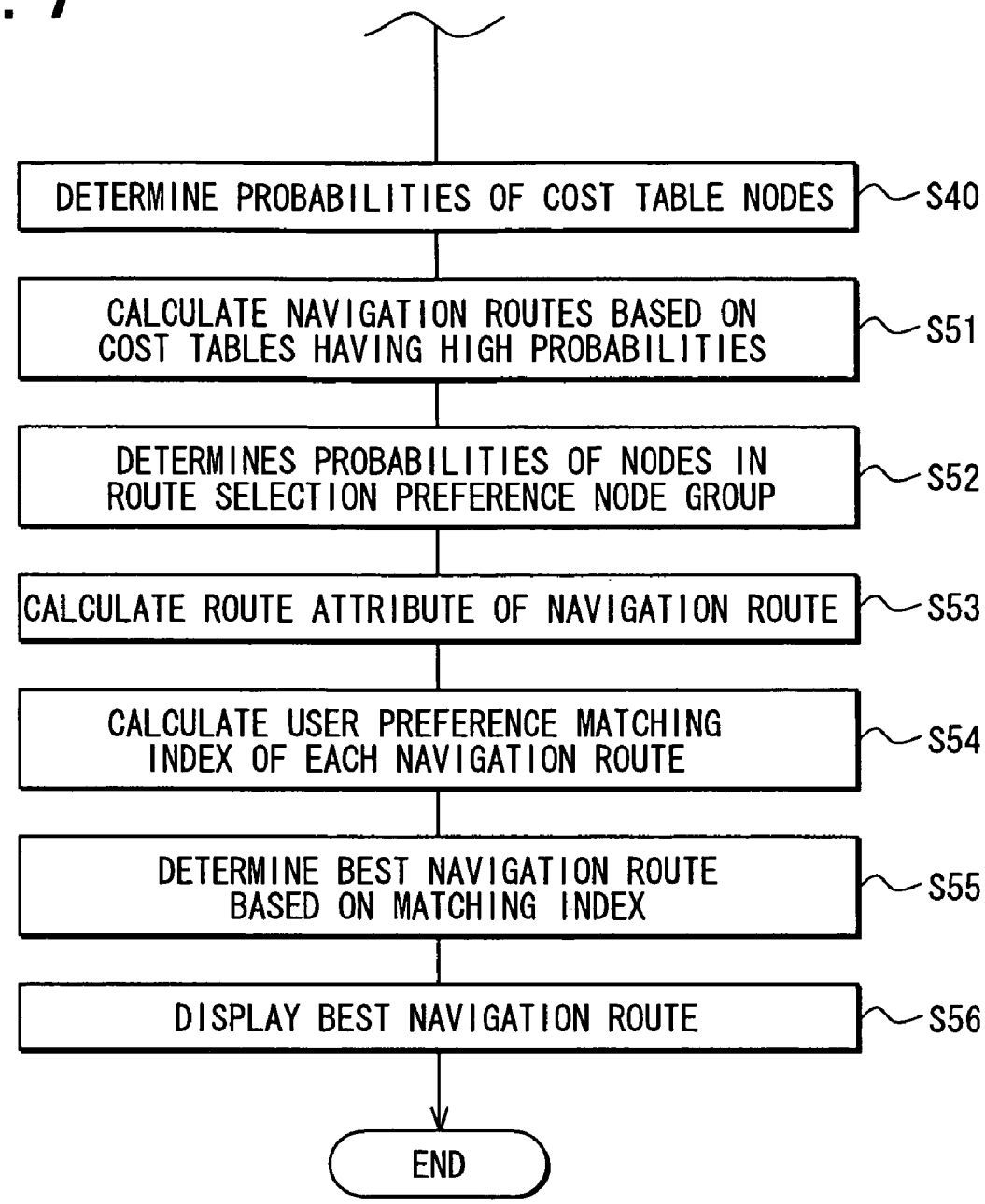
FIG. 7 shows a flowchart of an alternative process for weighting factor determination and route calculation in the control unit.

FIG. 7 shows an alternative process for weighting factor determination and route calculation in the control unit 8. The alternative process takes the same steps for the steps S10 to S40.

In step S51, the process selects a predetermined number of cost tables based on the probability calculated in step S40. More practically, the predetermined number of cost tables having high probability are chosen to be used as the weighting factors in the cost evaluation function Ci. Then, the navigation routes are calculated by using Dijkstra method or the like based on the cost evaluation function Ci having the weighting factors in the selected cost tables.

Figure 8:
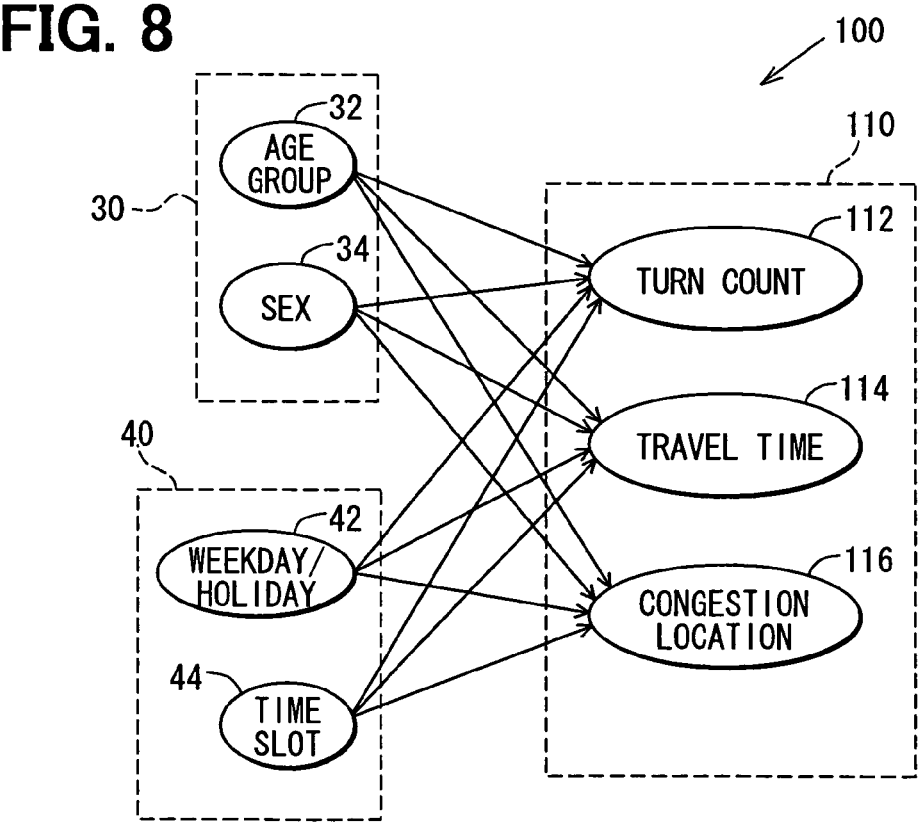
FIG. 8 shows an illustration of a reference model for a route attribute preference determination.

In step S52, the process determines the probabilities of the nodes in a route selection preference node group 110 including a right/left turn count node 112, a travel time node 114, a congestion location node 116 based on the input of the user information and the travel situation in step S10 being taken the observation nodes 32, 34, 42, 44 of the route selection preference node group 110 in the Bayesian network model shown in FIG. 8. More practically, the probability of the turn count node 112 may be defined as 70% of less than 10 turns and 30% of equal to or more than 10 turns.

The route selection preference node group may include the node for representing (1) a traffic signal condition (an average interval of the traffic signals), (2) closeness of the start point to a difficult location in the route such as a bridge, a tunnel or the like, (3) a detour condition. These attributes account for the preference of the entire route instead of the preference of route segments considered in the Dijkstra method.

In step S53, the process calculates the route attributes (i.e., the turn count, the travel time, the congestion location) for the navigation routes calculated in step S51. The node of the congestion location is used to represent the number of congestion location passage by the travel of the calculated navigation route. The number of the congestion location passage is determined based on the congestion locations predetermined in the map data.

In step S54, the process calculates user preference matching index for each of the calculated navigation route. The user preference matching index determines the total value of route attribute probabilities calculated for each of the calculated navigation routes. That is, in this case, the turn count, the travel time, the congestion location are included in the calculation of the probability summation. More practically, the probability of a certain navigation route having the turn count of 11 times is determined as 30% based on the example in the description of step S52.

In step S55, the process determines the navigation route having the highest user preference matching index as the best navigation route.

In step S56, the process displays the best navigation route on the display 10.

Such changes and modifications are to be understood as being within the scope of the present disclosure as defined by the appended claims.

What is claimed is:

1. A navigation system having a route calculation unit for providing a navigation route from a start point to a destination based on an evaluation of a plurality of cost parameters by an evaluation function, the navigation system comprising:
a storage unit for storing a table for determining a route attribute reference determiner based on a predetermined type of a travel situation which changes in a short term and user information;
a preference determination unit for determining a user preference regarding a route attribute based on the travel situation of an actual state of traveling and the user information, wherein a route attribute reference determiner is employed for determining the user preference based on the table; and
a weighting factor determination unit for determining a weighting factor based on the user preference.

2. The navigation system as in claim 1,
wherein the table includes an observation parameter having binary condition for representing a weekday and a holiday.

3. The navigation system as in claim 1,
wherein the table is defined by Bayesian network model.

4. The navigation system as in claim 1,
wherein a plurality of the weighting factors in the cost evaluation function are organized as a weighting factor table,
a plurality of the weighting factor tables are organized as a weighting factor table set, and
the weighting factor determination unit determines the weighting factors by selecting the weighting factor table in the weighting factor table set.

5. The navigation system as in claim 4 further comprising:
a route option calculation unit in the route calculation unit for calculating plural optional routes respectively by employing the weighting factor table determined by the weighting factor determination unit;
a route attribute determination unit in the route calculation unit for determining the user preference for each of the optional routes calculated by the route option calculation unit, wherein the route attribute in the user preference for each of the optional routes is determined by the preference determination unit; and
a route determination unit in the route calculation unit for determining a preferred route by evaluating the route attribute of each of the optional routes determined by the route attribute determination unit in terms of matching degree to the user preference determined by the preference determination unit.

6. The navigation system as in claim 4 further comprising:
a similar route determination unit for determining the optional route that is most similar to a navigation route actually traveled from among the plural optional routes based on the evaluation by the evaluation function that uses weighting factor table chosen from the weighting factor table set; and
a relation determination unit in the weighting factor determination unit for modifying the table, wherein the table determined by the relation determination unit is modified so that the similar route determination unit determines the most similar optional route to the actually traveled navigation route based on the weighting factor table suitable for the travel situation in the actually traveled navigation route.

7. A program for controlling the navigation system as in claim 1, the program stored in a storage medium for use in a computer that is functional as the navigation system comprising a procedure of:
executing a function of the weighting factor determination unit.

8. A navigation system having a route calculation unit for providing a navigation route from a start point to a destination based on an evaluation of a plurality of cost parameters by an evaluation function, the navigation system comprising:
a storage unit for storing a weighting factor determination relation for determining a weighting factor of the cost parameter based on a travel situation of predetermined type identified in a specific length of time;
a weighting factor determination unit for determining the weighting factor based on the weighting factor determination relation and the travel situation derived from an actual state of traveling; and
a preference determination unit for determining user preference regarding a route attribute based on the travel situation of the actual state of traveling and user information,
wherein a plurality of the weighting factors in the cost evaluation function are organized as a weighting factor table,
a plurality of the weighting factor tables are organized as a weighting factor table set,
the weighting factor determination unit determines the weighting factors by selecting the weighting factor table in the weighting factor table set, and
wherein a route attribute reference determiner is employed for determining the user preference based on the travel situation and the user information;
a route option calculation unit in the route calculation unit for calculating plural optional routes respectively by employing the weighting factor table determined by the weighting factor determination unit;

a route attribute determination unit in the route calculation unit for determining the user preference for each of the optional routes calculated by the route option calculation unit, wherein the route attribute in the user preference for each of the optional routes is determined by the preference determination unit; and a route determination unit in the route calculation unit for determining a preferred route by evaluating the route attribute of each of the optional routes determined by the route attribute determination unit in terms of matching degree to the user preference determined by the preference determination unit.

9. A navigation system having a route calculation unit for providing a navigation route from a start point to a destination based on an evaluation of a plurality of cost parameters by an evaluation function, the navigation system comprising:

a storage unit for storing a weighting factor determination relation for determining a weighting factor of the cost parameter based on a travel situation of predetermined type identified in a specific length of time;

a weighting factor determination unit for determining the weighting factor based on the weighting factor determination relation and the travel situation derived from an actual state of traveling, wherein a plurality of the weighting factors in the cost evaluation function are organized as a weighting factor table, a plurality of the weighting factor tables are organized as a weighting factor table set, and the weighting factor determination unit determines the weighting factors by selecting the weighting factor table in the weighting factor table set;

a similar route determination unit for determining an optional route that is most similar to a navigation route actually traveled from among plural optional routes based on the evaluation by the evaluation function that uses the weighting factor table chosen from the weighting factor table set; and a relation determination unit in the weighting factor determination unit for modifying the weighting factor determination relation, wherein the weighting factor determination relation determined by the relation determination unit is modified so that the similar route determination unit determines the most similar optional route to the actually traveled navigation route based on the weighting factor table suitable for the travel situation in the actually traveled navigation route.

10. A navigation system having a route calculation unit for providing a navigation route from a start point to a destination based on an evaluation of a plurality of cost parameters by an evaluation function, the navigation system comprising:

a storage unit for storing a table for determining a weighting factor of the cost parameter based on a predetermined type of a travel situation which changes in a short term; and a weighting factor determination unit for determining the weighting factor based on The table and the travel situation derived from an actual state of traveling, wherein:

the table comprises nodes representing plural unchanging user information, plural temporally varying travel situation information, critical attributes, and plural cost nodes, the travel situation information nodes and unchanging user information nodes being parent nodes of the critical attribute nodes, and the critical attribute nodes being parent nodes of the plural cost nodes, the weighting factor is determined by the weighting factor determination unit by changing conditional dependencies between child nodes and parent nodes based on the actual state of traveling.

11. The navigation system as in claim 1, wherein the preference determination unit changes the user preference regarding the route attribute determined by the preference determination unit based on an actually traveled route, the travel situation at an actual time of traveling, and the user information at the actual time of traveling.

12. The navigation system as in claim 8, wherein the preference determination unit changes the user preference regarding the route attribute determined by the preference determination unit based on an actually traveled route, the travel situation at an actual time of traveling, and the user information at the actual time of traveling.

13. The navigation system as in claim 10, wherein the conditional dependencies between the child nodes and the parent nodes are changed based on an actually traveled route, the travel situation at an actual time of traveling, and the user information at the actual time of traveling.

* * * * *